United States Patent
Wikström et al.

(10) Patent No.: US 11,323,203 B2
(45) Date of Patent: May 3, 2022

(54) REPORTING OF CHANNEL QUALITY INDICATORS CORRESPONDING TO TARGET ERROR RATES IN WIRELESS COMMUNICATION NETWORKS

(71) Applicant: TELEFONAKTIEBOLAGET LM ERICSSON (PUBL), Stockholm (SE)

(72) Inventors: Gustav Wikström, Täby (SE); Muhammad Kazmi, Sundbyberg (SE); Joachim Sachs, Sollentuna (SE); Kittipong Kittichokechai, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 37 days.

(21) Appl. No.: 16/480,921

(22) PCT Filed: Dec. 22, 2017

(86) PCT No.: PCT/IB2017/058361
§ 371 (c)(1),
(2) Date: Jul. 25, 2019

(87) PCT Pub. No.: WO2018/127765
PCT Pub. Date: Jul. 12, 2018

(65) Prior Publication Data
US 2020/0007270 A1  Jan. 2, 2020

Related U.S. Application Data

(60) Provisional application No. 62/443,181, filed on Jan. 6, 2017.

(51) Int. Cl.
*H04L 1/00* (2006.01)
*H04W 72/04* (2009.01)
(Continued)

(52) U.S. Cl.
CPC ........ *H04L 1/0026* (2013.01); *H04B 17/309* (2015.01); *H04L 1/0003* (2013.01);
(Continued)

(58) Field of Classification Search
CPC ..... H04L 1/0003; H04L 1/009; H04L 1/0025; H04L 1/0026; H04L 1/0031; H04L 1/203; H04L 5/0057; H04W 72/08; H04W 72/082; H04W 72/085
See application file for complete search history.

(56) References Cited

U.S. PATENT DOCUMENTS

2008/0310353 A1* 12/2008 Love ................ H04L 1/0009
370/329
2010/0067396 A1   3/2010 Cui et al.
(Continued)

FOREIGN PATENT DOCUMENTS

CN    101867391 A    10/2010
CN    102223210 A    10/2011
(Continued)

OTHER PUBLICATIONS

3GPP TSG RAN WG1 Meeting #87: "Scheduling and CQI feedback for URLLC"; Reno USA, Nov. 14-18, 2016; 6 pages.
(Continued)

*Primary Examiner* — Marcus Smith
(74) *Attorney, Agent, or Firm* — Sage Patent Group

(57) ABSTRACT

User equipments, radio network nodes, and related methods, are provided for enabling reporting of channel quality indicator values corresponding to a particular error rate level among a plurality of error rate levels and to a particular modulation and coding scheme among a plurality of modulation and coding schemes.

18 Claims, 7 Drawing Sheets

(51) Int. Cl.
  *H04B 17/309* (2015.01)
  *H04W 4/70* (2018.01)
  *H04L 1/20* (2006.01)
  *H04L 5/00* (2006.01)
  *H04W 72/08* (2009.01)
  *H04B 7/06* (2006.01)

(52) U.S. Cl.
  CPC ............ *H04L 1/0009* (2013.01); *H04L 1/203* (2013.01); *H04L 5/0057* (2013.01); *H04W 72/0413* (2013.01); *H04W 72/085* (2013.01); *H04B 7/0632* (2013.01); *H04W 4/70* (2018.02)

(56) References Cited

U.S. PATENT DOCUMENTS

| | | |
|---|---|---|
| 2016/0204841 A1 | 7/2016 | Kim et al. |
| 2017/0238255 A1* | 8/2017 | Chari .................... H04L 1/0057 455/574 |
| 2019/0089439 A1* | 3/2019 | Shimomura ........ H04W 72/085 |
| 2019/0190644 A1* | 6/2019 | Ugurlu ................ H04W 72/042 |
| 2020/0169902 A1* | 5/2020 | Yasukawa ............. H04W 72/04 |

FOREIGN PATENT DOCUMENTS

| | | |
|---|---|---|
| CN | 106209299 A | 12/2016 |
| EP | 3439355 A1 | 2/2019 |
| WO | 2018/044849 A1 | 3/2018 |

OTHER PUBLICATIONS

First Chinese Office Action for Chinese Patent Application No. CN 201780088103.X dated Aug. 31, 2021, 16 pages (including English translation).

European Office Action for European Patent Application No. 17832813.4 dated Oct. 8, 2021, 8 pages.

* cited by examiner

REPORTING OF CHANNEL QUALITY INDICATORS CORRESPONDING TO TARGET ERROR RATES IN WIRELESS COMMUNICATION NETWORKS

RELATED APPLICATIONS

The present application claims the benefits of priority of U.S. Provisional Patent Application No. 62/443,181, entitled "CHANNEL QUALITY INDICATOR REPORTING IN WIRELESS COMMUNICATION NETWORKS", and filed at the United States Patent and Trademark Office on Jan. 6, 2017, the content of which is incorporated herein by reference.

TECHNICAL FIELD

The present description generally relates to wireless communications and wireless communication networks, and more particularly relates to channel quality indicator reporting in wireless communications and wireless communication networks.

BACKGROUND

Machine Type Communication

Machine type communication (MTC), also referred to as machine-to-machine (M2M) communication, is used for establishing communication between machines and between machines and humans. MTC communications may comprise exchange of data, signaling, measurement data, configuration information, etc. MTC devices are quite often used for applications like sensing environmental conditions (e.g. temperature reading), metering or measurement (e.g. electricity usage, etc.), fault finding or error detection, etc. There are several MTC use-cases that can be classified into two broader groups depending on their requirements: massive MTC and critical MTC (C-MTC). For massive MTC, low cost and enhanced coverage are very important aspects. For C-MTC, high reliability of data delivery and low latency are more important issues.

High Reliability and Low Latency Target

Current wireless interfaces typically operate at $10^{-1}$ (10%) reliability with round-trip time (RTT) for packet delivery being in the order of tens of milliseconds (e.g. 10 to 100 ms).

But the requirements for mission critical machine type communication (C-MTC) are very stringent. They are expressed in terms of delay and reliability and also often called as ultra-low latency and very low latency respectively. C-MTC is also interchangeably called Ultra-Reliable and Low Latency Communications (URLLC). Examples of delay and reliability targets for C-MTC are:

Very short end-to-end delay or round-trip delay, e.g., between 1 and 10 ms;

Very high reliability of data transmission, e.g., packet delivery error rate not exceeding $10^{-9}$.

The above requirements imply another operating point than current solutions are designed for.

Critical MTC devices may also operate in a wide range of radio and operating environments e.g. under high temperature, low speed but high delay spread, etc.

Latency Reduction with Short Subframes

Packet data latency is one of the performance metrics that vendors, operators and also end-users (via speed test applications) regularly measure. Latency measurements are usually done in all phases of a radio access network system lifetime, for instance when verifying a new software release or system component, when deploying a system, and when the system is in commercial operation.

Shorter latency than previous generations of 3GPP radio access technologies (RATs) was one performance metric that guided the design of Long Term Evolution (LTE). LTE is also now recognized by the end-users to be a system that provides faster access to internet and lower data latencies than previous generations of mobile radio technologies.

Packet data latency is important not only for the perceived responsiveness of the system; it is also a parameter that indirectly influences the throughput of the system. HTTP/TCP is the dominating application and transport layer protocol suite used on the internet today. According to the HTTP Archive (http://httparchive.org/trends.php), the typical size of HTTP-based transactions over the internet is in the range of a few tens of kilobyte up to one megabyte. In this size range, the TCP slow start period is a significant part of the total transport period of the packet stream. During TCP slow start, the performance is latency-limited. Hence, improved latency can rather easily be showed to improve the average throughput for this type of TCP-based data transactions.

Radio resource efficiency could be positively impacted by latency reductions. Lower packet data latency could increase the number of transmissions possible within a certain delay bound. Hence, higher block error rate (BLER) targets could be used for the data transmissions, thereby freeing up radio resources and potentially improving the capacity of the system.

One area to address when it comes to packet latency reductions is the reduction of transport time of data and control signaling, and more particularly, the reduction of the length of a transmission time interval (TTI). The term TTI used herein may correspond to any time period (TO) over which a physical channel can be encoded and optionally interleaved for transmission. The physical channel is decoded by the receiver over the same time period (TO) over which it was encoded. In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix. In LTE release 13, a study item was started during 2015 with the goal of specifying transmissions with shorter TTIs that are much shorter than the LTE release 8 TTI.

The shorter TTIs can be decided to have any duration in time and comprise resources on a number of OFDM or SC-FDMA symbols within a 1 ms subframe. As one example, the duration of the short TTI may be 0.5 ms, i.e. seven OFDM or SC-FDMA symbols for the case with normal cyclic prefix. As another example, the duration of the short TTI may be 2 symbols. Such TTI may also interchangeably be called as short TTI (sTTI), transmission time, slot, sub-slot, mini-slot, short subframe (SSF), mini-subframe, mini-TTI etc.

Channel State Information (CSI) Measurements

Channel state information (CSI) measurements are performed and reported by the UE to a radio network node e.g. serving base station. They are defined to facilitate one or more operations performed by the radio network node. Examples of such operations are scheduling, link adaptation, selection of antennas of the UE, power control or adjustment in the DL and/or in the UL, selection of antenna transmission mode, etc.

The CSI measurements are typically performed on some kind of reference signals (e.g. cell specific reference signal (CRS), CSI-RS, etc.) that are transmitted in the downlink by the serving cell of the UE. The radio network node can request the UE to estimate and send periodic and/or aperiodic CSI reports. Non-limiting examples of different types of CSI reports in LTE are:

Rank indication (RI): RI is a recommendation to the radio network node on how many layers in the downlink transmission must be used in the serving cell. The RI is only one value which means that the recommended rank is valid across the whole bandwidth.

Precoder matrix indication (PMI): PMI indicates the recommended precoder matrix that must be used in the downlink transmission in the serving cell. The recommended precoder matrix can be frequency-selective.

Channel quality indicator (CQI): CQI corresponds to the highest modulation and coding that can be used for downlink transmission to the UE in the serving cell. CQI can be frequency-selective too, which means that multiple CQI reports can be sent for different parts of the bandwidth. However, the indication does not comprise explicitly the signal quality metric (such as RSRQ). The CQI is usually estimated on CRS transmitted in the serving cell.

CSI-RS Resource Indicator (CRI): If the UE is configured with CSI-RS, then the UE may be requested to report CSI-RS Resource Indicator (CRI) estimated on CSI-RS.

CSI Interference Measurement (CSI-IM): If the UE is configured with resources for performing CSI Interference Measurement (CSI-IM), then the UE may be requested to report CSI-IM measurements to the network node.

Channel Quality Indicator (CQI)

CQI may be understood as information signaled by a UE to the radio network node to indicate a suitable data rate, typically, a modulation and coding scheme (MCS) value, for downlink transmissions, usually based on a measurement of the received downlink signal to interference plus noise ratio (SINR) and knowledge of the receiver characteristics of the UE. In LTE, the CQI indices and their interpretations are given in section 7.2.3 of 3GPP TS 36.213 for reporting CQI based on Quadrature Phase Shift Keying (QPSK), 16 Quadrature Amplitude Modulation (QAM), 64QAM, and 256 QAM. Table 1 below depicts an example of an existing 4-bit CQI table, as described in 3GPP TS 36.213 V12.4.0, Table 7.2.3-1.

TABLE 1

Table 7.2.3-1: 4-bit CQI Table

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |

TABLE 1-continued

Table 7.2.3-1: 4-bit CQI Table

| CQI index | modulation | code rate x 1024 | efficiency |
|---|---|---|---|
| 14 | 64 QAM | 873 | 5.1152 |
| 15 | 64 QAM | 948 | 5.5547 |

Table 1 comprises a number of entries or rows. Each entry has assigned an identifier, the CQI index, which is a number from 0 to 15 in this case. Each entry is associated with a respective value of modulation, e.g., QPSK, 16QAM or 64QAM. Each entry is also associated with a respective value of code rate and efficiency. In Table 1, the code rate×1024 indicates a quantized version of the code rate. Also in the table, the efficiency indicates the number of information bits that may be sent per modulation symbol. Out of range, in Table 1, indicates that the radio network node, e.g., the eNodeB, may not reliably transmit a transport block to the UE, even with the lowest modulation and coding rate scheme, i.e., the CQI index 1 does not satisfy the condition of transport block error probability not exceeding 0.1 when the PDSCH uses the corresponding combination of modulation scheme and transport block size.

According to section 7.2.3 of 3GPP TS 36.213, based on an unrestricted observation interval in time and frequency, the UE may derive, for each CQI value reported in uplink subframe n, the highest CQI index between 1 and 15 in Table 7.2.3-1, or Table 7.2.3-2, which satisfies the following condition, or CQI index 0 if CQI index 1 does not satisfy the condition:

A single Physical Downlink Share Channel (PDSCH) transport block with a combination of modulation scheme and transport block size corresponding to the CQI index, and occupying a group of downlink physical resource blocks termed the Channel State Information (CSI) reference resource, could be received with a transport block error probability not exceeding 0.1.

The existing CQI tables may not be applied to MTC since the existing CQI tables assume that a PDSCH transmission is contained within a single subframe. This may not work for low-complexity and/or enhanced coverage MTC UEs because they may rely on repetitions of data transmission, which may extend beyond a single subframe. The existing CQI tables assumes that one PDSCH transmission carries one transport block (TB). In MTC scenarios, for instance in massive MTC, the numerous repetitions of a single PDSCH, together may carry a single TB. The number of repetitions of the PDSCH may be tens of repetitions or hundreds of repetitions, depending on the level of degraded channel quality the UE experiences. Ignoring the availability of the PDSCH repetitions may lead to the UE indicating lower CQI index than necessary. For example, down to a certain degraded channel quality, using the existing CQI table may lead to the UE indicating "out of range" to the radio network node (e.g., the eNB), causing the radio network node to not schedule any PDSCH transport block to the UE. Therefore, applying the existing CQI tables to MTC may severely bias the PDSCH transport block transmission to a low modulation and coding scheme corresponding to a low CQI, including no scheduled transmission opportunity, leading to a reduced performance of the wireless communication network.

SUMMARY

With current CQI reporting in LTE, the BLER is fixed to 10% and the mapping to different MCS corresponds to different modulations and code rates which should enable the highest possible bitrate for the current channel at 10% BLER. In cases of communication with higher reliability, the target BLER is generally very low (e.g. $10^{-9}$). However, CQI reporting under such a low BLER may not always be possible. Therefore, based on the current LTE mechanism of reporting the CQI, the UE may not consistently report the CQI. This, in turn, may disrupt the scheduling in the radio network node because it relies on the CQI reported by the UE.

Hence, according to a broad aspect, a new type of CQI reporting is proposed in which the UE can report a CQI value or index corresponding to both a target error rate level among a plurality of target error rate levels and to a modulation and coding scheme (MCS) among a plurality of MCSs.

According to one aspect, some embodiments include a method performed in a user equipment, UE, the method comprising determining a channel quality indicator, CQI, value corresponding to an error rate level among a plurality of error rate levels, and to a modulation and coding scheme, MCS, among a plurality of MCSs, the CQI value being determined based at least in part on at least one signal quality of signals received from a radio network node, and transmitting the determined CQI value to the radio network node.

In some embodiments, the method may comprise, or further comprise, transmitting an indication of the error rate level and/or of the MCS corresponding to the determined CQI value to the radio network node.

In some embodiments, the plurality of error rate levels may be pre-defined at the UE and/or may be configured at the UE by the radio network node.

In some embodiments, the plurality of error rate levels comprises two or more error rate levels.

In some embodiments, the method may comprise, or further comprise, receiving CQI reporting instructions from the radio network node prior to determining a CQI value corresponding to an error rate level among a plurality of error rate levels and to an MCS among a plurality of MCSs. In such embodiments, the CQI reporting instructions may be received from the radio network node via RRC signaling.

In some embodiments, the method may comprise, or further comprise, determining that a target quality value is below a threshold prior to determining a CQI value corresponding to an error rate level among a plurality of error rate levels and to an MCS among a plurality of MCSs. The target quality value may be a block error rate, BLER, target. In such embodiments, the method may comprise, or further comprise, receiving CQI reporting instructions from the radio network node prior to determining that a target quality value is below a threshold.

In some embodiments, the method may comprise, or further comprise, determining that a signal quality value is above a threshold prior to determining a CQI value corresponding to an error rate level among a plurality of error rate levels and to an MCS among a plurality of MCSs. In such embodiments, the method may comprise, or further comprise, receiving CQI reporting instructions from the radio network node prior to determining that a signal quality value is above a threshold.

In some embodiments, the signals received from the radio network node may be reference signals. In such embodiments, the reference signals may be cell-specific reference signals, CRSs, or channel state information reference signals, CSI-RSs.

In some embodiments, the at least one signal quality of the signals received from the radio network node comprises a signal to interference and noise ratio, SINR, of the signals received from the radio network node.

In some embodiments, the plurality of error rate levels is a plurality of block error rates, BLERs.

According to another aspect, some embodiments include a UE configured, or operable, to perform one or more UE functionalities (e.g. steps, actions, etc.) as described herein.

In some embodiments, the UE may comprise a communication interface configured to communicate with one or more network nodes (including radio network nodes), and processing circuitry operatively connected to the communication interface, the processing circuitry being configured to perform one or more UE functionalities as described herein. In some embodiments, the processing circuitry may comprise at least one processor and at least one memory storing instructions which, upon being executed by the processor, configure the processor to perform one or more UE functionalities as described herein.

In some embodiments, the UE may comprise one or more functional modules configured to perform one or more UE functionalities as described herein.

According to another aspect, some embodiments include a non-transitory computer-readable medium storing a computer program product comprising instructions which, upon being executed by processing circuitry (e.g., a processor) of the UE, configure the processing circuitry to perform one or more UE functionalities as described herein.

According to another aspect, some embodiments include a method performed in a radio network node, the method comprising receiving a channel quality indicator, CQI, value from a user equipment, UE, the CQI value corresponding to an error rate level among a plurality of error rate levels, and to a modulation and coding scheme, MCS, among a plurality of MCSs, the CQI value being determined based at least in part on at least one signal quality of signals transmitted to the UE, and performing at least one operational task (e.g. link adaptation, scheduling, signal repetition, etc.) based at least in part on the received CQI value.

In some embodiments, the method may comprise, or further comprise, receiving an indication of the error rate level and/or of the MCS corresponding to the received CQI value from the UE.

In some embodiments, the plurality of error rate levels may be pre-defined at the UE. In some embodiments, the method may comprise, or further comprise, configuring the plurality of error rate levels at the UE.

In some embodiments, the plurality of error rate levels comprises two or more error rate levels.

In some embodiments, the method may comprise, or further comprise, transmitting CQI reporting instructions to the UE prior to receiving a CQI value corresponding to an error rate level among a plurality of error rate levels and to an MCS among a plurality of MCSs. In such embodiments, the CQI reporting instructions may be transmitted to the UE via RRC signaling.

In some embodiments, the at least one operational task may comprise one or more of scheduling of further signals to the UE, performing link adaptation for the UE, adapting a downlink transmit power for downlink transmission to the UE, adapting a number of transmit antennas for downlink transmission to the UE, and/or adapting a number of signal repetitions for downlink transmission to the UE.

In some embodiments, the signals transmitted to the UE are reference signals. In such embodiments, the reference signals may be cell-specific reference signals, CRSs, or channel state information reference signals, CSI-RSs.

In some embodiments, the at least one signal quality of the signals transmitted to the UE comprises a signal to interference and noise ratio, SINR, of the signals transmitted to the UE.

In some embodiments, the plurality of error rate levels is a plurality of block error rates, BLERs.

According to another aspect, some embodiments include a radio network node configured, or operable, to perform one or more radio network node functionalities (e.g. steps, actions, etc.) as described herein.

In some embodiments, the radio network node may comprise a communication interface configured to communicate with one or more UEs, other radio network node and/or with one or more network nodes, and processing circuitry operatively connected to the communication interface, the processing circuitry being configured to perform one or more radio network node functionalities as described herein. In some embodiments, the processing circuitry may comprise at least one processor and at least one memory storing instructions which, upon being executed by the processor, configure the processor to perform one or more radio network node functionalities as described herein.

In some embodiments, the radio network node may comprise one or more functional modules configured to perform one or more radio network node functionalities as described herein.

According to another aspect, some embodiments include a non-transitory computer-readable medium storing a computer program product comprising instructions which, upon being executed by processing circuitry (e.g., a processor) of the radio network node, configure the processing circuitry to perform one or more radio network node functionalities as described herein.

Broadly, some embodiments may enable radio network nodes (e.g. base stations such as eNBs) to schedule highly reliable transmissions by configuring, for instance, transmission parameters (e.g. the repetition level) based on the improved CQI reporting.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

A more complete understanding of the embodiments described herein, and the attendant advantages and features thereof, will be more readily understood by reference to the following detailed description when considered in conjunction with the accompanying drawings wherein.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Figure 1:
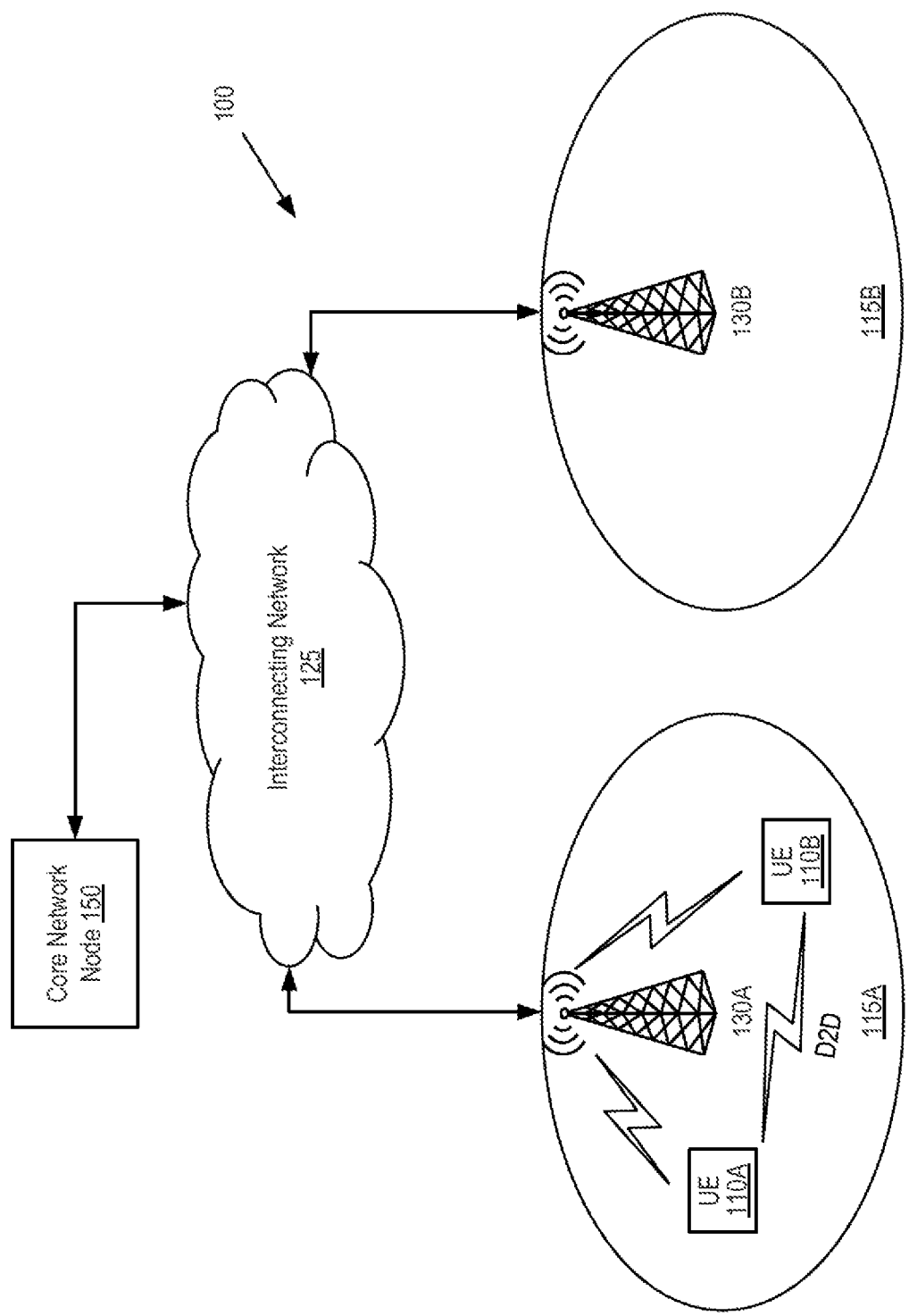
FIG. 1 is a schematic diagram of an example communication network in accordance with some embodiments.

FIG. 1 illustrates an example of a wireless communication network 100 that may be used for wireless communications. Wireless network 100 includes UEs 110A-110B and a plurality of radio network nodes 130A-130B (e.g., eNBs, gNBs, etc.) connected to one or more core network nodes 150 via an interconnecting network 125. The network 100 may use any suitable deployment scenarios. UEs 110 within coverage areas 115 may each be capable of communicating directly with radio network nodes 130 over a wireless interface. In certain embodiments, UEs 110 may also be capable of communicating with each other via device-to-device (D2D) communication.

As an example, UE 110A may communicate with radio network node 130A over a wireless interface. That is, UE 110A may transmit wireless signals to and/or receive wireless signals from radio network node 130A. The wireless signals may contain voice traffic, data traffic, control signals, and/or any other suitable information.

In some embodiments, an area of wireless signal coverage associated with a radio network node 130 (e.g., coverage area 115A associated with radio network node 130A, and coverage area 115B associated with radio network node 130B) may be referred to as a cell.

The term "radio network node" may be used herein to refer to any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, remote radio unit (RRU), remote radio head (RRH), nodes in distributed antenna system (DAS) etc.

The term "network node" may be used herein to refer to a radio network node or another network node, e.g., a core network node, MSC, MME, O&M, OSS, SON, positioning node (e.g. E-SMLC), MDT node, etc.

The terms "user equipment" or "UE" may be used herein to refer to any type of wireless device communicating with a network node and/or with another UE in a cellular or mobile or wireless communication system. Examples of UE are target device, device to device (D2D) UE, MTC UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc.

Some embodiments are described for LTE based systems such as MTC, eMTC, NB-IoT etc. As an example, MTC UE, eMTC UE and NB-IoT UE also called as UE category 0, UE category M1 and UE category NB1. However, the embodiments are applicable to any RAT or multi-RAT systems, where the UE receives and/or transmit signals (e.g. data) e.g. LTE FDD/TDD, WCDMA/HSPA, GSM/GERAN, WiFi, WLAN, CDMA2000, 5G, NR, etc.

The term "signal" may be used herein to refer to a physical signal or a physical channel. Physical signal does not contain higher layer information whereas physical channel contains higher layer information or data. Examples of physical signals are CRS, SRS, DMRS, PRS, MBSFN RS, CSI-RS, etc. Examples of physical channels are data channel or physical data channels (e.g. PDSCH, sPDSCH, NPDSCH, PUSCH, sPUSCH, NPUSCH, etc.), control channel or physical control channel. Examples of control channel are PDCCH, sPDCCH, NPDCCH, MPDCCH, PUCCH, NPUCCH, sPUCCH, RACH, NRACH, ePDCCH, PBCH, NPBCH, etc.

The term "time resource" may be used herein to refer to any type of physical resource or radio resource expressed in terms of length of time. Examples of time resources are: symbol, time slot, subframe, radio frame, TTI, interleaving time, special subframe, UpPTS, short TTI (sTTI), short subframe (SSF), etc.

The term "physical resource" may be used herein to refer to a time resource and/or to a frequency resource. Examples of physical resource are resource block (RB), physical RB (PRB), virtual RB (VRB), resource element (RE), etc.

The embodiments described herein may apply to any RRC state, e.g., RRC_CONNECTED or RRC_IDLE.

In some embodiments, the UE may operate under either normal coverage or enhanced coverage with respect to a cell e.g. a serving cell, a neighbor cell, a reference cell, etc. Enhanced coverage may also be referred to as extended coverage. In some embodiments, the UE may also operate in a plurality of coverage levels, e.g., normal coverage, enhanced coverage level 1, enhanced coverage level 2, enhanced coverage level 3, and so on.

In case of enhanced/extended coverage, the UE may be capable of operating under lower signal quality level (e.g. SNR, SINR, ratio of average received signal energy per subcarrier to total received power per subcarrier (Es/Iot), RSRQ, etc.) compared to its capabilities when operating in non-enhanced/extended coverage systems. The coverage level enhancement may vary with the operational scenario and may also depend on the UE type. For example, a UE which is located in a basement with bad coverage may need larger level of coverage enhancement (e.g. 20 dB) compared to a UE which is at a cell border (e.g. −3 dB).

The coverage level may be expressed in terms of:
received signal quality and/or received signal strength at the UE with respect to its serving cell; and/or
received signal quality and/or received signal strength at the serving cell with respect to the UE.

The coverage level of the UE or coverage enhancement (CE) level may also be defined with respect to any cell such as a neighbor cell. For example, in terms of received signal quality and/or received signal strength at the UE with respect to a target cell on which it performs one or more radio measurements.

As indicated in Release 13 and before of 3GPP TS 36.213, section 7.2.3, a given CQI index generally corresponds to a modulation and coding scheme (MCS) that would meet a fixed block error rate (BLER) of 10% given the downlink signal quality (e.g. downlink SINR). A different type of CQI reporting is proposed to allow a UE to report a CQI value or index that corresponds to a modulation and coding scheme (MCS) that would meet one out of a plurality of different error rate target levels (e.g. different BLER levels). In other words, the new CQI value would correspond to both a specific modulation and coding scheme (MCS) and a specific error rate level (e.g. BLER level).

Hence, in accordance with some embodiments, in order to achieve reliable transmissions of signals between the radio network node (e.g. radio network node 130) and the UE (e.g. UE 110), the UE is allowed to report a CQI value (e.g., a CQI index) corresponding to a specific error rate level (e.g. a specific BLER) out of a plurality of error rate levels, rather than for only one fixed error rate level (e.g., a BLER of $10^1$ as specified in 3GPP TS 36.213, section 7.2.3). Allowing the UE to report different CQI values for different error rate levels enables improved (e.g., more robust) transmissions between the radio network node and the UE. For instance, based on the reported CQI value and its corresponding error rate level, the radio network node may select a particular modulation and coding scheme (MCS) to meet a more stringent error rate level.

Hence, the UE is generally configured to be able to determine a CQI value corresponding to the estimated signal quality of signals received from the radio network node for one error rate level among a plurality of different error rate levels and for one MCS among a plurality of different MCSs, and report, to the radio network node, the determined CQI value. In some instances, the error rate level and/or the MCS corresponding to the determined CQI value may be explicitly reported by the UE along with the CQI value. In other instances, the error rate level and/or the MCS corresponding to the determined CQI value may be implicitly determined by the radio network node based on the CQI value received from the UE. For example, a given CQI value (or index) may correspond to a given error rate level. In some embodiments, even though the UE can possibly report CQI values for a plurality of different error rate levels, the UE may be configured to report CQI values for only one of the plurality of different error rate levels. Such embodiments may be referred to as using a single-level error rate CQI reporting mechanism. In some other embodiments, the UE may be configured to report CQI values for any one of the plurality of different error rate levels. Such embodiments may be referred to as using a multi-level error rate CQI reporting mechanism.

Single-Level Error Rate CQI Reporting

In the single-level error rate CQI reporting mechanism, the UE is configured to report a CQI value corresponding to a predetermined error rate level among a plurality of different error rate levels. The predetermined error rate level may be pre-configured or may be configured by the radio network node.

In some embodiments, the single-level error rate CQI reporting mechanism may support a single set of error rate levels. For instance, the set of error rate levels may include a BLER of $10^{-1}$ and a BLER of $10^{-3}$ such that only the CQI values corresponding to a BLER of $10^{-1}$ or the CQI values corresponding to a BLER of $10^{-3}$ can be reported. In some other embodiments, the single-level error rate CQI reporting mechanism may support several sets of error rate levels. As an example, a first set may include a BLER of $10^{-1}$ and a BLER of $10^{-3}$, and a second set may include a BLER of $10^{-1}$, a BLER of $10^{-3}$ and a BLER of $10^{-5}$. According to the first set, only the CQI values corresponding to a BLER of $10^{-1}$ or the CQI values corresponding to a BLER of $10^{-3}$ can be reported. According to the second set, only the CQI values corresponding to a BLER of $10^{-1}$, or the CQI values corresponding to a BLER of $10^{-3}$, or the CQI values corresponding to a BLER of $10^{-5}$ can be reported. Hence, in such embodiments, the UE could be configured or pre-configured with multiple CQI tables, each of which being configured to different error rate levels.

Multi-Level Error Rate CQI Reporting

In the multi-level error rate CQI reporting mechanism, the UE is configured to report a CQI value corresponding to one out of at least two different error rate levels (e.g. $CQI_1$ and $CQI_2$ correspond to $BLER_1$ and $BLER_2$ respectively). Hence, in the multi-level error rate CQI reporting mechanism, for the same channel quality, the UE can report a CQI value that would meet a first error rate level or a different CQI value that would meet a second and different error rate level.

In some embodiments, when operating according to the multi-level error rate CQI reporting mechanism, the UE may support only one set of error rate levels. For example, the CQI values corresponding to a BLER of $10^{-3}$ and a BLER of $10^{-5}$ can be reported. In some embodiments, when operating according to the multi-level error rate CQI reporting mechanism, the UE may support two or more sets of error rate levels. As an example, in one set, the CQI values corresponding to a BLER of $10^{-3}$ and a BLER of $10^{-5}$ can be reported, while in another set the CQI values corresponding to a BLER of $10^{-3}$, a BLER of $10^{-5}$, and a BLER of $10^{-7}$ can be reported.

The multi-level error rate CQI reporting mechanism may be explained with the example below.

Figure 2:
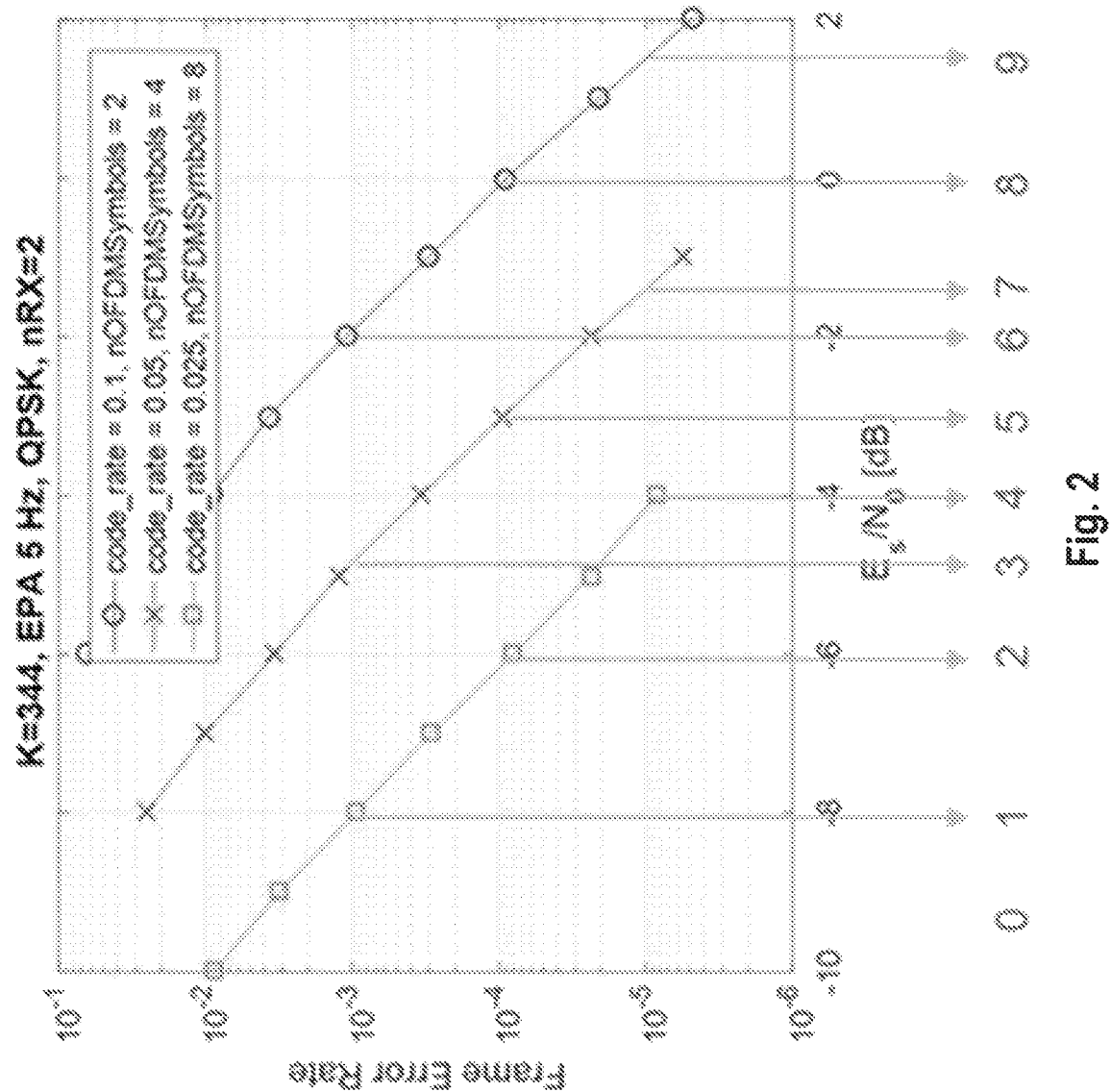
FIG. 2 is a graph of examples block error rate (BLER) values for signal to interference and noise ratio (SINR) and related CQI values for three different code rates and three BLER threshold levels.

Consider three reliable MCS indices: 0, 1, and 2, pre-defined in UE and the radio network node (e.g. eNB, gNB) and corresponding to e.g. QPSK modulation with three low code rates. Consider also three BLER levels: $10^{-3}$, $10^{-4}$, and $10^{-5}$. The CQI reporting can then correspond to the MCS indices and the estimated BLER level as in FIG. 2 and Table 2, where the reported BLER level is below the reported threshold value.

TABLE 2

Example of CQI reporting for three MCS and three BLER levels.

| CQI reported | MCS | BLER level |
| --- | --- | --- |
| 0 | 0 | $>=10^{-3}$ |
| 1 | 0 | $<10^{-3}$ |
| 2 | 0 | $<10^{-4}$ |
| 3 | 1 | $<10^{-3}$ |
| 4 | 0 | $<10^{-5}$ |
| 5 | 1 | $<10^{-4}$ |
| 6 | 2 | $<10^{-3}$ |
| 7 | 1 | $<10^{-5}$ |
| 8 | 2 | $<10^{-4}$ |
| 9 | 2 | $<10^{-5}$ |

The table can be pre-defined or configured by the radio network node. With the multiple BLER levels, the minimum reliability can still be guaranteed (e.g., BLER $10^{-3}$) while allowing the link to have even higher reliability if desired or needed for certain applications. In some embodiments, the highest index for a certain measured channel quality (e.g. measured SINR) may be reported, thereby enabling the highest rate for a certain BLER target.

In some embodiments, the UE measures downlink signal quality on a set of downlink reference symbols used for reliable communication. The UE reports the CQI value or index which corresponds to a given MCS and a given BLER value. In some embodiments, the UE may not need to explicitly signal the BLER value since the reported CQI value or index may implicitly indicate the associated BLER.

The UE may automatically calculate the reliability level corresponding to a certain SINR and MCS configuration based on its own configuration and the network configuration. If, for instance, the UE has 4 RX antennas in use it should have a multi-level error CQI reporting adjusted to this, which should be different from the 2 RX antenna case.

As an embodiment, the UE can consider its known speed in the CQI reporting. A higher speed can be adjusted for in terms of a margin added to the CQI reporting, such that a better channel quality is required to report a certain BLER level.

Triggering of Multi-Level Error Rate CQI Reporting Mechanism in the UE

In some embodiments, the multi-level error rate CQI reporting mechanism in the UE can be activated or triggered according to different modes of operations.

In one mode of operations, the UE may always (i.e. by default) report CQI according to the multi-level error rate CQI reporting mechanism.

In another mode of operations, the UE may report CQI according to the multi-level error rate CQI reporting mechanism based on a relation between a quality target (Qt), e.g. a BLER level target, and a threshold (H). For example, if the quality target Qt is below threshold H, then the UE initiates the multi-level error rate CQI reporting mechanism for estimating and reporting the CQI to the radio network node. Otherwise, if the quality target Qt is equal or above threshold H, then the UE initiates the single-level error rate CQI reporting mechanism for estimating and reporting the CQI. For example, if threshold H is $10^{-3}$ and the BLER level target Qt is below $10^{-4}$, then the UE will use the multi-level error rate CQI reporting mechanism for CQI reporting. Both the quality target and the threshold (H) can be pre-defined or configured by the radio network node.

In yet another mode of operations, the UE may report CQI according to the single-level error rate CQI reporting mechanism or the multi-level error rate CQI reporting mechanism based on configuration information or instructions received from the radio network node. For example, the radio network node can instruct the UE by configuration, over RRC signaling or via other downlink control signaling (e.g. MAC signaling, L1 signaling, etc.), to switch to the multi-level error rate CQI reporting mechanism or to the single-level error rate CQI reporting mechanism.

The UE, upon receiving the instruction to switch to the multi-level error rate CQI reporting mechanism, may assume a limited set of preconfigured MCS used for reliable communication. For this set of reliable MCS, the UE measures the channel quality (e.g. in terms of SINR) on the downlink reference symbols, and reports the estimated BLER level according to a predefined pattern for the MCS in question.

In some embodiments, two or more sets of multi-level error rate CQI reporting mechanisms (i.e., two or more sets of error rate levels) and/or two or more sets of the single error rate CQI reporting mechanisms (i.e., two or more sets of error rate levels) may be pre-defined and supported by the UE. In this case, the radio network node may also indicate the particular set of error rate levels of the CQI reporting mechanism which the UE should apply for estimating and reporting the CQI.

In some embodiments, the radio network node can decide to configure the UE with a particular type of the CQI reporting mechanisms based on one or more of the following criteria:
  Target quality or BLER target required in the DL (e.g., multi-level error rate CQI reporting mechanism is used when the BLER target is below certain threshold);
  Signal quality (e.g., when DL signal quality of the UE is above a threshold then multi-level error rate CQI reporting mechanism is used).

In yet another mode of operations, the UE may report CQI according to the single-level error rate CQI reporting mechanism by default. However, the radio network node can request the UE to switch to the multi-level error rate CQI reporting mechanism. Upon receiving the request, the UE switches from the single-level error rate CQI reporting mechanism to the multi-level error rate CQI reporting mechanism. The radio network node can further request the UE to switch back to the single error rate CQI reporting mechanism.

Figure 3:
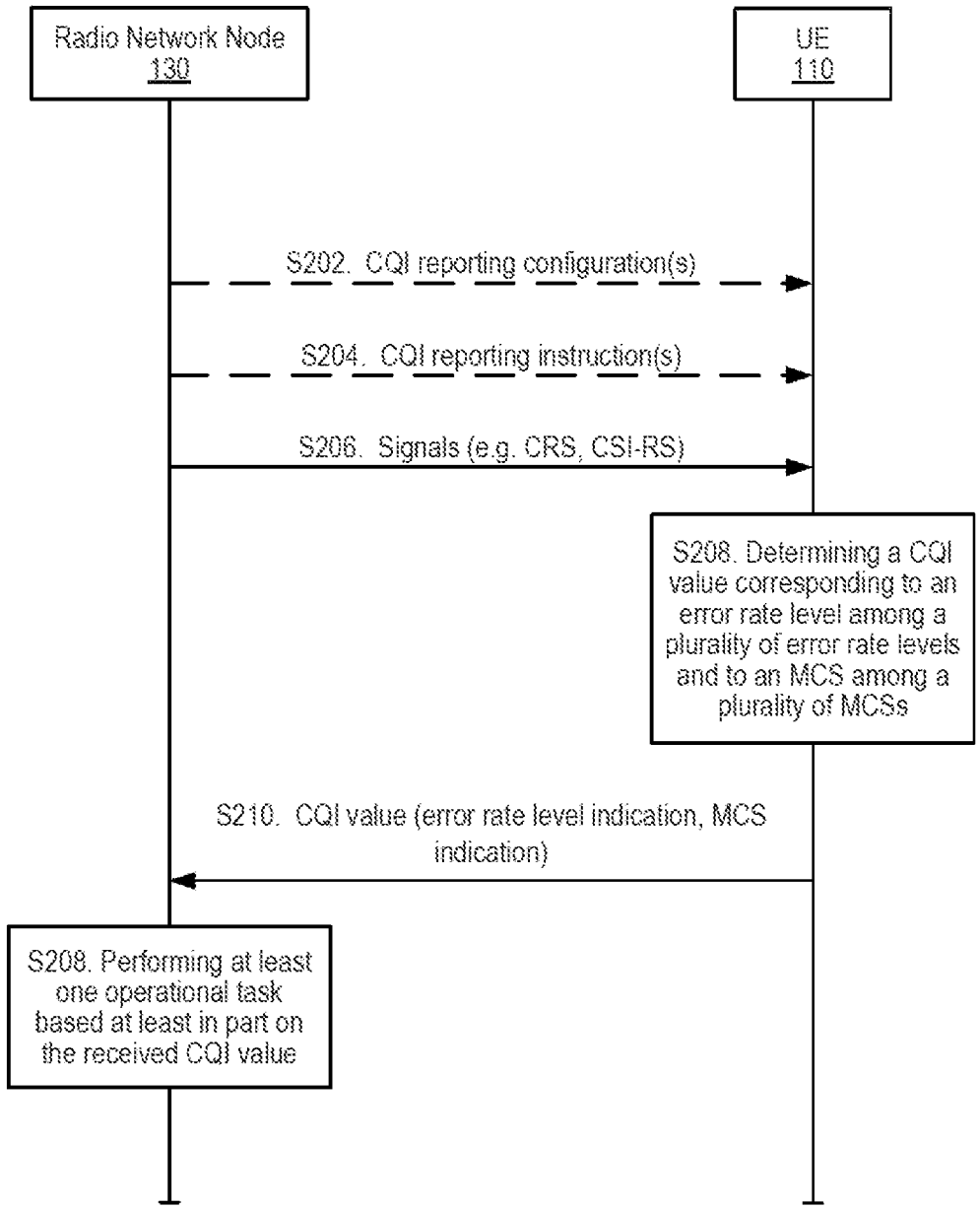
FIG. 3 is a high-level signaling diagram in accordance with some embodiments.

Referring now to FIG. 3, a high-level signaling diagram according to some embodiments is depicted. As shown, the radio network node 130 may transmit various CQI reporting configuration and/or instructions to the UE 110 (actions S202 and S204). In some embodiments, the CQI reporting configuration transmitted by the radio network node 130 to the UE 110 may comprise the predetermined error rate level or levels to be used by the UE 110 when reporting CQI. In some embodiments, the CQI reporting configuration transmitted by the radio network node 130 to the UE 110 may alternatively, or additionally, comprise a target error rate and/or a threshold to be used by the UE 110 when reporting CQI. For their parts, the CQI report instructions, if present, may comprise instructions for the UE 110 to operate, for instance, according the single-level error rate CQI reporting mechanism or according to the multi-level error rate CQI reporting mechanism. As indicated above however, in some embodiments, the UE 110 may be preconfigured with some or all the CQI reporting configuration, making the transmission of the CQI reporting configuration by the radio network node 130 to the UE 110 optional.

Regardless of whether the UE 110 is preconfigured with CQI reporting configurations or the UE 110 receives CQI reporting configurations from the radio network node 130, at some point, the UE 110 receives signals transmitted by the radio network node 130 (action S206). These signals may comprise reference signals such as, but not limited to, CRS and CSI-RS. The signals transmitted by the radio network node 130 will be used by the UE 110 to determine or otherwise derive a CQI value.

The UE 110 then determines the CQI value corresponding to an error rate level among a plurality of error rate levels and to a modulation and coding scheme (MCS) among a plurality of MCSs (action S208). The determined CQI value is based, at least in part, on one or more signal qualities of the received signals (e.g. received signals SINR).

The UE 110 then reports the determined CQI value to the radio network node 130 (action S210). In some embodiments, the UE may explicitly transmit an indication of the error rate level and/or an indication of the MCS corresponding to the determined CQI value. In some other embodiments, the error rate level and/or the MCS corresponding to the determined CQI value may be implicit, e.g., the error rate level and/or the MCS may be indicated by the actual reported CQI value.

The radio network node 130 may then perform at least one operational task based, at least in part, on the received CQI value (action S212). Examples of such operational tasks include:
  Scheduling of signals to the UE 110 in the downlink;
  Link adaptation e.g. selection of an MCS;
  Adapting the downlink transmit power e.g. downlink power control;
  Adapting a number of transmit antennas for transmit signals to the UE;
  Adapting a number of repetitions of downlink signals based on CQI. For example, if the reported CQI value corresponds to BLER target above the BLER threshold (e.g. $10^{-5}$), then the radio network node 130 may schedule downlink signals to the UE with certain number of repetitions to enhance the downlink signal quality at the UE.

Figure 4:
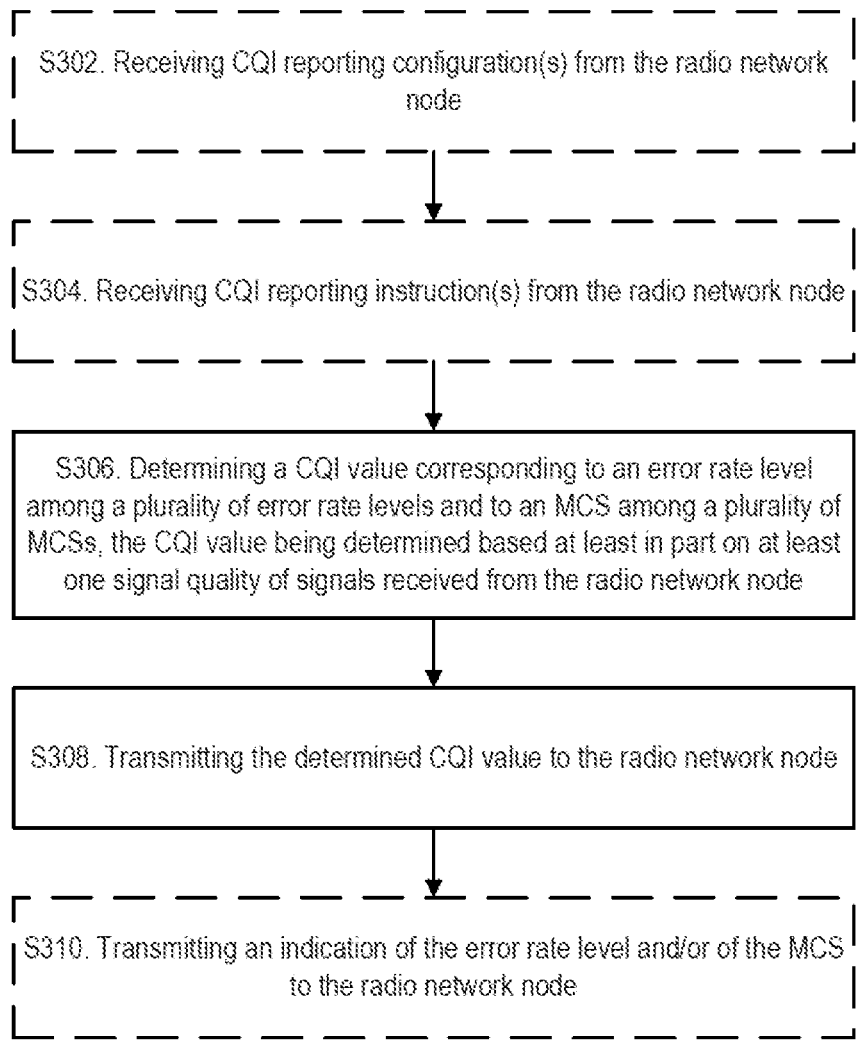
FIG. 4 is a flow chart of the operation of a user equipment in accordance with some embodiments.

FIG. 4 is a flow chart that illustrates the operations of the UE 110 in accordance with some embodiments. As illustrated, the UE may receive CQI reporting configuration(s) and/or CQI reporting instruction(s) from the radio network node 130 (actions S302 and S304). In some embodiments, the CQI reporting configuration(s) may comprise the predetermined error rate level or levels to be used by the UE 110 when reporting CQI. In some embodiments, the CQI reporting configuration may alternatively, or additionally, comprise a target error rate and/or a threshold to be used by the UE 110 when reporting CQI. For their parts, the CQI report instructions, if present, may comprise instructions for the UE 110 to operate, for instance, according the single-level error rate CQI reporting mechanism or according to the multi-level error rate CQI reporting mechanism. The reception of the CQI reporting configuration(s) and/or CQI reporting instruction(s) are optional as the UE 110 may be pre-configured with some or all the CQI reporting configurations.

Regardless, the UE 110 determines a CQI value corresponding to an error rate level among a plurality of error rate levels and to an MCS among a plurality of MCSs based, at least in part, on the one or more signal qualities of signals received from the radio network node (action S306). Determining the CQI value corresponding to the given error rate level and MCS may comprise determining a signal quality measurement, e.g. a SINR measurement, based on the signals received from the radio network node 130, and then determining a CQI index that provides the best combination of error rate level and MCS (e.g. selecting the highest CQI index) given the measured signal quality. In some embodiments, the CQI index could be retrieved from a single table in which a given CQI index corresponds to a given MCS and a given BLER level. In such embodiments, the CQI index would implicitly indicate the BLER level and the MCS for which the CQI index is reported. In some other embodiments, the CQI index could be retrieved from two or more tables, each table corresponding, for example, to a given BLER level. In such embodiments, the UE 110 may need to report, in addition to the CQI index, the corresponding BLER level (or the corresponding table) to allow the radio network node 130 to determine to which error rate level the reported CQI index corresponds.

Once the CQI value is determined, the UE 110 transmits the determined CQI value to the radio network node 130 (action S308). In some embodiments, the UE 110 may transmit, or further transmit, an indication of the error rate level and/or of the MCS corresponding to the determined CQI value to the radio network node 130 (action S310).

Figure 5:
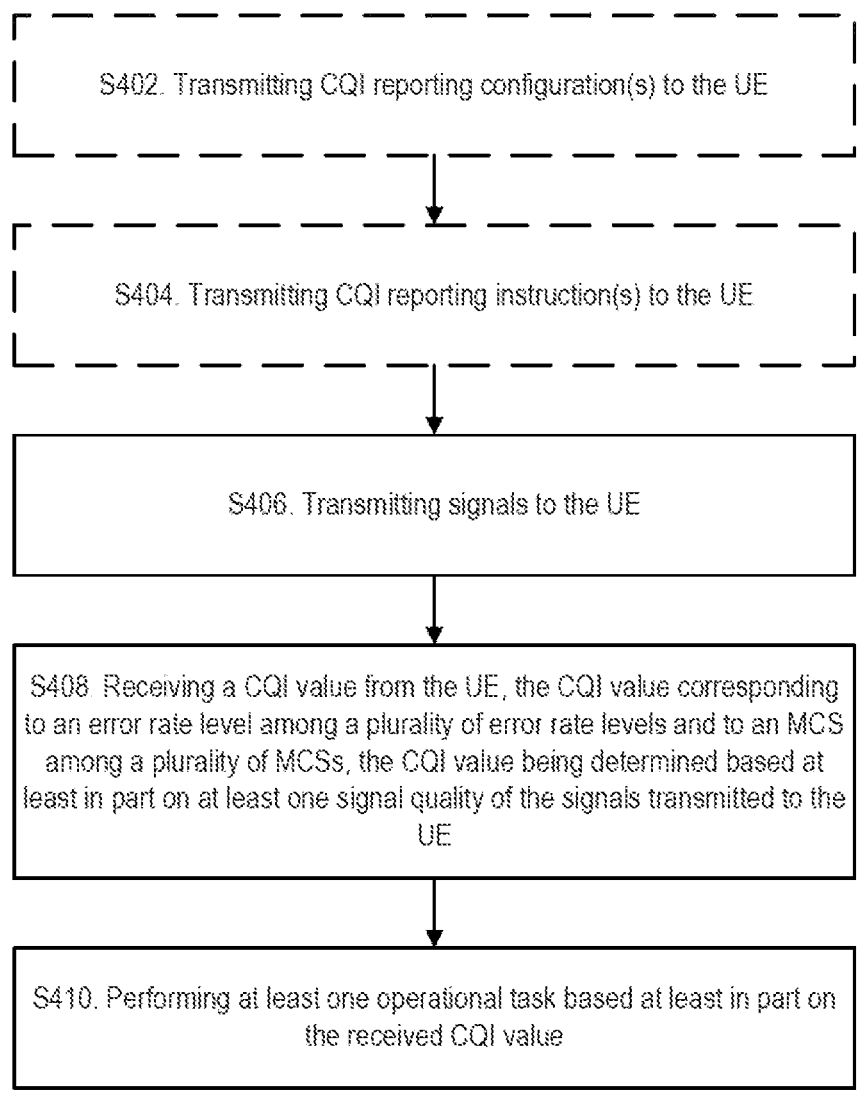
FIG. 5 is a flow chart of the operation of a radio network node in accordance with some embodiments.

FIG. 5 is a flow chart that illustrates the operations of the radio network node 130 in accordance with some embodiments. As illustrated, the radio network node 130 may transmit CQI reporting configuration(s) and/or CQI reporting instruction(s) to the UE 110 (actions S402 and S404). In some embodiments, the CQI reporting configuration(s) may comprise the predetermined error rate level or levels to be used by the UE 110 when reporting CQI. In some embodiments, the CQI reporting configuration may alternatively, or additionally, comprise a target error rate and/or a threshold to be used by the UE 110 when reporting CQI. For their parts, the CQI reporting instructions, if present, may comprise instructions for the UE 110 to operate, for instance, according the single-level error rate CQI reporting mechanism or according to the multi-level error rate CQI reporting mechanism. The transmissions of the CQI reporting configuration(s) and/or of the CQI reporting instruction(s) are optional as the UE 110 may be preconfigured with some or all the CQI reporting configurations.

Whether or not the radio network node 130 transmits the CQI reporting configuration(s) and/or the CQI reporting instruction(s), the radio network node 130 transmits signals to the UE 110 (action S406). These signals may include reference signals such as, but not limited to, CRS and CSI-RS.

The radio network node 130 then receives a CQI value from the UE, the CQI value being determined based at least in part on one or more signal qualities of the signals transmitted to the UE (action S408). The CQI value corresponds to an error rate level among a plurality of error rate levels and to an MCS among a plurality of MCSs.

Based at least in part on the received CQI value, the radio network node 130 may then perform at least one operational task (action S410). In some embodiments, these one or more operational tasks may include scheduling, link adaptation (e.g. selection of MCS), power control, etc.

Figure 6:
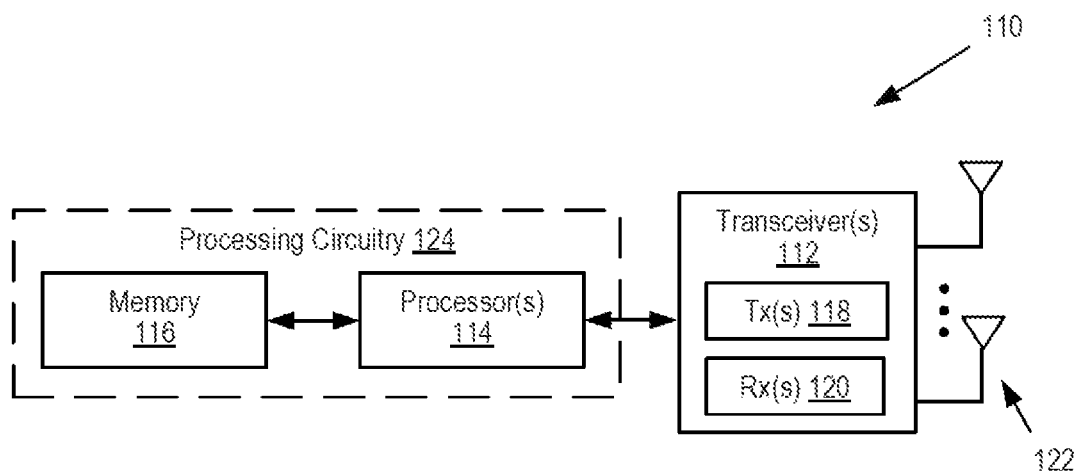
FIG. 6 is a block diagram of a user equipment in accordance with some embodiments.

FIG. 6 is a block diagram of an exemplary UE 110 in accordance with certain embodiments. UE 110 includes one or more of a transceiver 112, processor 114, and memory 116. In some embodiments, the transceiver 112 facilitates transmitting wireless signals to and receiving wireless signals from radio network node 130 (e.g., via transmitter(s) (Tx) 118, receiver(s) (Rx) 120, and antenna(s) 122). The processor 114 executes instructions to provide some or all of the functionalities described as being provided by UE 110, and the memory 116 stores the instructions to be executed by the processor. In some embodiments, the processor 114 and the memory 116 form processing circuitry 124.

The processor 114 may include any suitable combination of hardware to execute instructions and manipulate data to perform some or all of the described functions of UE 110, such as the functions of UE 110 described above. In some embodiments, the processor 114 may include, for example, one or more computers, one or more central processing units (CPUs), one or more microprocessors, one or more application specific integrated circuits (ASICs), one or more field programmable gate arrays (FPGAs) and/or other logic.

The memory 116 is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 114 of UE 110.

Other embodiments of UE 110 may include additional components beyond those shown in FIG. 6 that may be responsible for providing certain aspects of the UE's functionalities, including any of the functionalities described above and/or any additional functionalities (including any functionality necessary to support the solution described). As just one example, UE 110 may include input devices and circuits, output devices, and one or more synchronization units or circuits, which may be part of the processor 114. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 7:
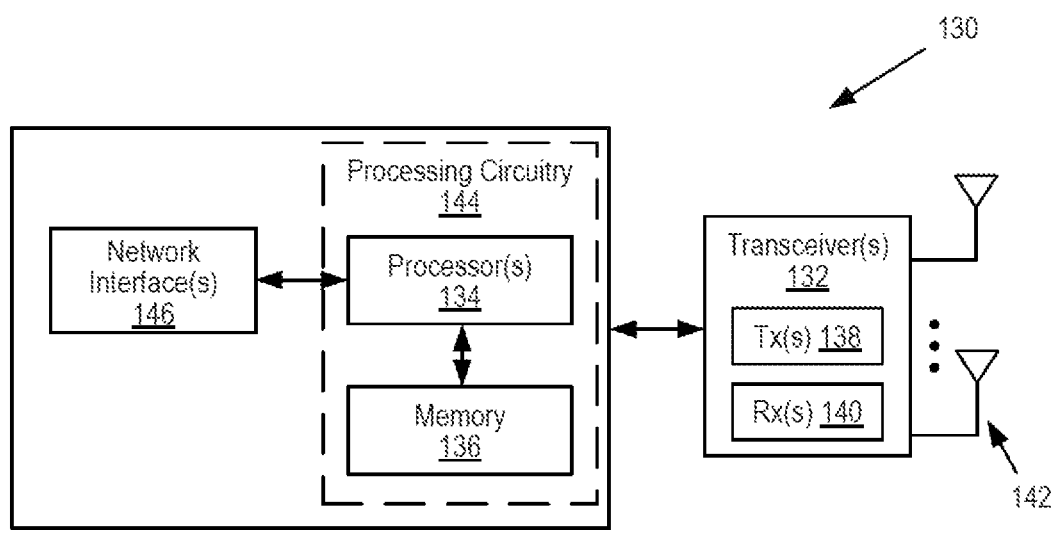
FIG. 7 is a block diagram of a radio network node in accordance with some embodiments.

FIG. 7 is a block diagram of an exemplary radio network node 130 in accordance with certain embodiments. Radio network node 130 may include one or more of a transceiver 132, processor 134, memory 136, and network interface 146. In some embodiments, the transceiver 132 facilitates transmitting wireless signals to and receiving wireless signals from UE 110 (e.g., via transmitter(s) (Tx) 138, receiver(s) (Rx) 140, and antenna(s) 142). The processor 134 executes instructions to provide some or all of the functionalities described as being provided by the radio network node 130, the memory 136 stores the instructions to be executed by the processor 134. In some embodiments, the processor 134 and the memory 136 form processing circuitry 144. The network interface 146 communicates signals to backend network components, such as a gateway, switch, router, Internet, Public Switched Telephone Network (PSTN), core network nodes or radio network controllers, etc.

The processor 134 may include any suitable combination of hardware to execute instructions and manipulate data to perform some or all of the described functions of radio network node 130, such as those described above. In some embodiments, the processor 134 may include, for example, one or more computers, one or more central processing units (CPUs), one or more microprocessors, one or more application specific integrated circuits (ASICs), one or more field programmable gate arrays (FPGAs) and/or other logic.

The memory 136 is generally operable to store instructions, such as a computer program, software, an application including one or more of logic, rules, algorithms, code, tables, etc. and/or other instructions capable of being executed by a processor. Examples of memory 136 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 146 is communicatively coupled to the processor 134 and may refer to any suitable device operable to receive input for radio network node 130, send output from radio network node 130, perform suitable processing of the input or output or both, communicate to other devices, or any combination of the preceding. The network interface 146 may include appropriate hardware (e.g., port, modem, network interface card, etc.) and software, including protocol conversion and data processing capabilities, to communicate through a network.

Other embodiments of radio network node 130 may include additional components beyond those shown in FIG. 7 that may be responsible for providing certain aspects of the radio network node's functionalities, including any of the functionalities described above and/or any additional functionalities (including any functionality necessary to support the solutions described). The various different types of network nodes may include components having the same physical hardware but configured (e.g., via programming) to support different radio access technologies, or may represent partly or entirely different physical components.

Processors, interfaces, and memory similar to those described with respect to FIGS. 6 and 7 may be included in other network nodes (such as core network node 150). Other network nodes may optionally include or not include a wireless interface (such as the transceivers described in FIGS. 6 and 7).

Figure 8:
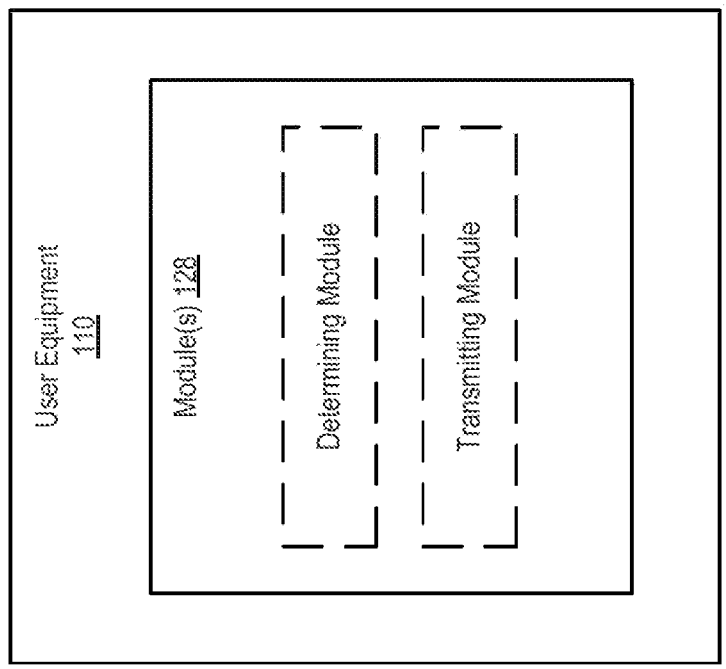
FIG. 8 is another block diagram of a user equipment in accordance with some embodiments.

In some embodiments, the UE 110 may comprise a series of functional modules 128 configured to implement the functionalities of the UE described above. Referring to FIG. 8, in some embodiments, the UE 110 may comprise a determining module configured to determine a channel quality indicator, CQI, value corresponding to an error rate level among a plurality of error rate levels and to a modulation and coding scheme, MCS, among a plurality of MCSs, the CQI value being determined based at least in part on at least one signal quality of signals received from a radio network node, and a transmitting module configured to transmit the determined CQI value to the radio network node.

It will be appreciated that the various modules 128 may be implemented as combination of hardware and/or software, for instance, the processor 114, memory 116, and transceiver(s) 112 of UE 110 shown in FIG. 6. Some embodiments may also include additional modules 128 to support additional and/or optional functionalities.

Figure 9:
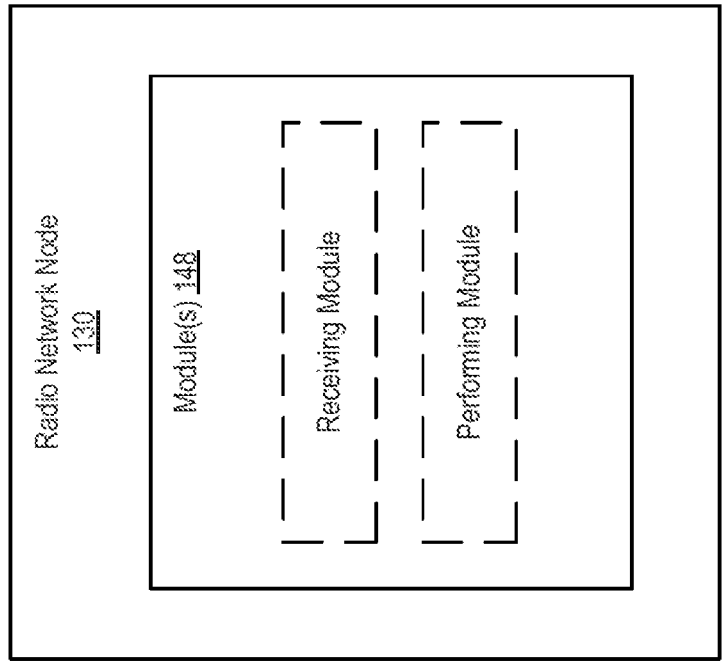
FIG. 9 is another block diagram of a radio network node in accordance with some embodiments.

In some embodiments, the radio network node 130 may comprise a series of functional modules 148 configured to implement the functionalities of the radio network node 130 described above. Referring to FIG. 9, in some embodiments, the radio network node 130 may comprise a receiving module configured to receive a channel quality indicator, CQI, value from a user equipment, UE, the CQI value corresponding to an error rate level among a plurality of error rate level and to a modulation and coding scheme, MCS, among a plurality of MCSs, the CQI value being determined based at least in part on at least one signal quality of signals transmitted to the UE, and a performing module configured to perform at least one operational task based at least in part on the received CQI value.

It will be appreciated that the various modules 148 may be implemented as combination of hardware and/or software, for instance, the processor 134, memory 136, and transceiver(s) 132 of radio network node 130 shown in FIG. 7. Some embodiments may also include additional modules 148 to support additional and/or optional functionalities.

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Abbreviations

The present description may comprise one or more of the following abbreviation:
BLER Block Error Rate
CQI Channel Quality Indicator
CSI Channel State Information
DCI Downlink Control Information
ePDCCH enhanced Physical Downlink Control Channel
E-SMLC evolved Serving Mobile Location Center
HTTP Hypertext Transfer Protocol
LTE Long Term Evolution
MAC Medium Access Control
MCS Modulation and Coding Scheme
MDT Minimization of Drive Tests
MME Mobility Management Entity
MPDCCH MTC Physical Downlink Control Channel
MSC Mobile Switching Center
NPBCH Narrowband Physical Broadcast Channel
NPDCCH Narrowband Physical Downlink Control Channel
NPUCCH Narrowband Physical Uplink Control Channel
NPUSCH Narrowband Physical Uplink Shared Channel
NRACH Narrowband Random Access Channel O&M Operation and Maintenance
OFDM Orthogonal Frequency Division Multiplexing
OFDMA Orthogonal Frequency Division Multiple Access
OSS Operations Support System
PBCH Physical Broadcast Channel
PDCCH Physical Downlink Control Channel
PDSCH Physical Downlink Shared Channel
PRB Physical Resource Block
ProSe Proximity Service
PUCCH Physical Uplink Control Channel
PUSCH Physical Uplink Shared Channel
RACH Random Access Channel
RAT Radio Access Technology
RB Resource Block
RE Resource Element
RRC Radio Resource Control
SC-FDMA Single Carrier Frequency Division Multiple Access
sPDCCH short Physical Downlink Control Channel
sPDSCH short Physical Downlink Shared Channel
sPUSCH short Physical Uplink Shared Channel
SF Subframe
SINR Signal to Interference and Noise Ratio
SNR Signal Noise Ratio
TCP Transmission Control Protocol
TTI Transmission Time Interval
UpPTS Uplink Pilot Time Slot
V2V Vehicle-to-Vehicle
V2X Vehicle-to-X

What is claimed is:

1. A method performed by a user equipment, UE, in a machine type communication (MTC) network, the method comprising:
determining a channel quality indicator, CQI, value corresponding to an error rate level among a plurality of configured error rate levels, and to a modulation and coding scheme, MCS, among a plurality of configured MCSs, the CQI value being determined based at least in part on at least one signal quality of signals received from a radio network node;
determining that a target quality value is below a threshold prior to determining the CQI value corresponding to the error rate level among the plurality of configured error rate levels and to the MCS among the plurality of configured MCSs;
transmitting the determined CQI value to the radio network node; and
automatically calculating a reliability level corresponding to the at least one signal quality of signals and configuration of the MCS based on configuration of the UE and the network configuration,
wherein the UE is configured to transmit the determined CQI based on at least one of: multi-level error rate CQI reporting mechanism when the target quality value is below the threshold and single-level error rate CQI reporting mechanism when the target quality value is above the threshold.

2. The method of claim 1, further comprising transmitting an indication of the error rate level corresponding to the determined CQI value and/or an indication of the MCS corresponding to the determined CQI value to the radio network node.

3. The method of claim 1, further comprising receiving CQI reporting instructions from the radio network node prior to determining the CQI value corresponding to error rate level among the plurality of configured error rate levels and to the MCS among the plurality of configured MCSs.

4. The method of claim 1, wherein the target quality value is a block error rate, BLER, target.

5. The method of claim 1, wherein the signals received from the radio network node are reference signals.

6. The method of claim 5, wherein the reference signals are cell-specific reference signals, CRSs, or channel state information reference signals, CSI-RSs.

7. The method of claim 1, wherein the at least one signal quality of the signals received from the radio network node comprises a signal to interference and noise ratio, SINR, of the signals received from the radio network node.

8. The method of claim 1, wherein the plurality of configured error rate levels is a plurality of configured block error rates, BLERs.

9. The method of claim 1, further comprising determining that a signal quality value is above a threshold prior to determining a CQI value corresponding to an error rate level among a plurality of configured error rate levels and to an MCS among a plurality of configured MCSs.

10. A user equipment, UE, in a machine type communication (MTC) network, comprising:
a processing circuitry that comprises:
a processor; and
a memory storing instructions which, upon being executed by the processor,
configure the processor to:
determine a channel quality indicator, CQI, value corresponding to an error rate level among a plurality of configured error rate levels, and to a modulation and coding scheme, MCS, among a plurality of configured MCSs, the CQI value being determined based at least in part on at least one signal quality of signals received from a radio network node;
determine that a target quality value is below a threshold prior to determining the CQI value corresponding to the error rate level among the plurality of configured error rate levels and to the MCS among the plurality of configured MCSs;
transmit the determined CQI value to the radio network node; and
automatically calculate a reliability level corresponding to the at least one signal quality of signals and configuration of the MCS based on configuration of the UE and the network configuration,
wherein the UE is further operable to transmit the determined CQI based on at least one of: multi-level error rate CQI reporting mechanism when the target quality value is below a threshold and single-level error rate CQI reporting mechanism when the target quality value is above the threshold.

11. The UE of claim 10, further operable to transmit an indication of the error rate level corresponding to the determined CQI value and/or an indication of the MCS corresponding to the determined CQI value to the radio network node.

12. The UE of claim 10, further operable to receive CQI reporting instructions from the radio network node prior to determining a CQI value corresponding to an error rate level among a plurality of configured error rate levels and to an MCS among a plurality of configured MCSs.

13. The UE of claim 10, wherein the target quality value is a block error rate, BLER, target.

14. The UE of claim 10, wherein the signals received from the radio network node are reference signals.

15. The UE of claim 14, wherein the reference signals are cell-specific reference signals, CRSs, or channel state information reference signals, CSI-RSs.

16. The UE of claim 10, wherein the at least one signal quality of the signals received from the radio network node comprises a signal to interference and noise ratio, SINR, of the signals received from the radio network node.

17. The UE of claim 10, wherein the plurality of configured error rate levels is a plurality of configured block error rates, BLERs.

18. The UE of claim 10, further operable to determine that a signal quality value is above a threshold prior to determining a CQI value corresponding to an error rate level among a plurality of configured error rate levels and to an MCS among a plurality of configured MCSs.

* * * * *